US006892524B1

(12) United States Patent
Van Erden et al.

(10) Patent No.: US 6,892,524 B1
(45) Date of Patent: May 17, 2005

(54) LATCHING MECHANISM FOR COMBUSTION CHAMBER PLATE OF A FASTENER DRIVING TOOL

(75) Inventors: Donald L. Van Erden, Wildwood, IL (US); James E. Doherty, Barrington, IL (US); Joseph S. Adams, Salt Spring Island (CA)

(73) Assignee: Illinois Tool Works Inc., Glenview, IL (US)

( * ) Notice: Subject to any disclaimer, the term of this patent is extended or adjusted under 35 U.S.C. 154(b) by 55 days.

(21) Appl. No.: 10/700,081

(22) Filed: Nov. 3, 2003

(51) Int. Cl.[7] .................................................. F02C 5/00

(52) U.S. Cl. ...................... 60/39.6; 123/253; 123/46 R; 227/10

(58) Field of Search ........................... 60/39.6; 123/253, 123/256, 46 R, 46 A, 46 H; 227/8, 9, 10, 11

(56) References Cited

U.S. PATENT DOCUMENTS

| | | | | |
|---|---|---|---|---|
| 3,967,771 | A | * 7/1976 | Smith | 227/10 |
| 4,377,991 | A | * 3/1983 | Liesse | 123/46 SC |
| 4,712,379 | A | 12/1987 | Adams et al. | |
| 4,717,060 | A | 1/1988 | Cotta | |
| 4,773,581 | A | 9/1988 | Ohtsu et al. | |
| 5,181,495 | A | 1/1993 | Gschwend et al. | |
| 5,213,247 | A | * 5/1993 | Gschwend et al. | 227/10 |
| 5,680,980 | A | 10/1997 | Robinson | |
| 5,971,245 | A | 10/1999 | Robinson | |
| 6,102,270 | A | 8/2000 | Robinson | |
| 6,260,519 | B1 | 7/2001 | Phillips | |
| 6,419,168 | B1 | 7/2002 | Thieleke et al. | |
| 6,425,354 | B1 | 7/2002 | Buchel et al. | |
| 6,460,507 | B2 | 10/2002 | Thieleke et al. | |
| 6,463,894 | B2 | 10/2002 | Hasler et al. | |
| 6,505,767 | B2 | 1/2003 | Thieleke et al. | |
| 6,520,127 | B1 | 2/2003 | Thieleke et al. | |
| 6,526,926 | B1 | 3/2003 | Towfighi | |
| 2003/0094148 | A1 | 5/2003 | Toulouse | |

FOREIGN PATENT DOCUMENTS

| | | |
|---|---|---|
| DE | 199 62 711 | 5/2001 |
| DE | 100 28 555 | 9/2001 |
| DE | 199 62 695 | 12/2001 |

* cited by examiner

*Primary Examiner*—Hoang Nguyen
(74) *Attorney, Agent, or Firm*—Lisa M. Soltis; Mark W. Croll; Donald J. Breh

(57) ABSTRACT

A combustion chamber assembly for use in a combustion tool including a combustion chamber, at least one combustion chamber plate disposed in the chamber, the at least one combustion chamber plate and the chamber members being configured for relative reciprocal movement, the combustion chamber assembly having at least one latch member associated with control of movement of at least one plate within the combustion chamber to divide the chamber into multiple volumes. The combustion chamber assembly further has a release for the latch member for permitting relative movement of the at least one combustion chamber plate and the combustion chamber.

15 Claims, 5 Drawing Sheets

150
164
154
163
79
160
136
138
168
152
158
156
110
118

166
168

162
126
104

LATCHING MECHANISM FOR COMBUSTION CHAMBER PLATE OF A FASTENER DRIVING TOOL

BACKGROUND OF THE INVENTION

This invention relates to a latching mechanism for a simplified gas fastener-driving tool, in particular, a latching mechanism for use in a combustion chamber of such a tool. Such fastener-driving tools are available commercially from ITW-Paslode (a division of Illinois Tool Works, Inc.) of Vernon Hills, Ill.

Combustion-powered tools, or combustion tools, are known in the art, and one type of such tools, also known as IMPULSE® brand tools for use in driving fasteners into workpieces, is described in commonly assigned patents to Nikolich U.S. Pat. Re. No. 32,452, and U.S. Pat. Nos. 4,522,162; 4,483,473; 4,483,474; 4,403,722, 5,197,646 and 5,263,439, all of which are incorporated by reference herein. Similar combustion-powered nail and staple driving tools are available commercially from ITW-Paslode of Vernon Hills, Ill. under the IMPULSE□□and PASLODE® brands.

Fastener-driving tools are provided with a multitude of components necessary for performing ancillary functions of the tool. One particularly important ancillary function of the tool is scavenging. There are two basic ways that residual combustion products from a combustion chamber are scavenged: a) by dilution, and b) by displacement. The dilution method consists of driving air through the combustion chamber. Usually a fan drives this process. Typically, 2.5 times the combustion chamber volume change is needed to exchange the residual combustion gas with air, making it a relatively inefficient method.

A more efficient process is displacement. The displacement method consists of removing combustion products by reducing the combustion volume to zero, hence displacing the combustion products. Subsequently, when the volume is increased, air is drawn into the volume.

One disadvantage of the current combustion-powered tools used for fastening is that they have a multitude of components that perform the ancillary functions needed to support the basic function of the tool, such as the scavenging function. The use of expensive electronic or electrical components, including batteries, fan motors, control electronics and spark electronics for these ancillary functions is known.

A further disadvantage of these tools having complex components is that the additional components make the tool more susceptible to costly repairs.

Another approach to scavenging is taught by U.S. Pat. No. 4,712,379 to Adams, incorporated by reference herein, which discloses a combustion chamber divided by a movable plate with holes. The use of this approach accelerates the rate of combustion so that the combustion pressure reaches a maximum early in the drive stroke of the free piston. The acceleration in the rate of combustion is due to the turbulence created in the combustion chamber when the fuel-air mixture passes through the holes in the movable plate.

An advantage of using the movable plates is that the piston is shielded from the pressure increase in the first chamber where the combustion is initiated. A further advantage is that the combustion in the first chamber creates a flame that passes through the holes in the movable plate, and ignites the second chamber earlier in the piston's cycle. The earlier the pressure reaches its maximum in the piston drive stroke, the more energy is delivered to the fastener being driven, and ultimately, the work piece.

Another ancillary function of fastener-driving tools is to establish the correct fuel-air mixture needed for efficient combustion. This process is more difficult in the divided combustion chamber approach. Known solutions to establishing the correct fuel-air mixture include independently introducing the correct amount of fuel to each chamber or premixing the fuel and air in a pre-chamber before they are drawn into the divided combustion chamber.

One disadvantage is that these approaches involve additional components to support the mixing process. A further disadvantage is that these known approaches often cannot accommodate the tool when a rapid cycle is desired.

Thus, there is a need for a fastener-driving combustion tool with movable plates that does not require electric or electronic parts. There is also a need to provide a fastening tool combustion chamber that achieves the correct fuel-air mixture. Another need is to provide a fastening tool combustion chamber where the piston is shielded from the pressure increase in the first chamber where the combustion is initiated. There is also a need to provide the turbulance to achieve rapid burn. A still further need is to provide a fastening tool combustion chamber where the pressure is delivered to the piston early in its drive stroke. Yet another need is to provide a fastening tool combustion chamber that is less expensive to manufacture. Still another need is to provide a fastening tool combustion chamber that is less susceptible to costly repair. A further need is to provide a fastening tool combustion chamber that precisely controls the movement of the plates in the combustion chamber.

SUMMARY OF THE INVENTION

The above-listed concerns are addressed by the present combustion chamber assembly for a combustion-tool, which features a combustion chamber, at least one movable plate and a latching mechanism. The combustion chamber assembly provides a simplified movable plate that can be selectively positioned for achieving the desired fuel-air mixture. Movement of the plate is achieved by a variety of latches that are less expensive to manufacture and repair than the electric and electronic counterparts. Another feature of the present combustion chamber assembly is that the latch member also positions the movable plate in a specific location where increased pressure can be delivered to the piston early in the drive stroke. Shielding of the piston from pressure increases is also accomplished by positioning the movable plate between the regions where combustion is initiated and where the piston is housed. Still another feature of the present invention is the creation of the turbulance in the combustion chamber needed to achieve a rapid burn of the fuel air mixture.

More specifically, the present invention provides a combustion chamber assembly for use in a combustion tool including a combustion chamber having at least one combustion chamber plate disposed in the chamber and where the at least one combustion chamber plate and the chamber members are configured for relative reciprocal movement. The combustion chamber has at least one latch member associated with at least one of the combustion chamber members and the at least one combustion chamber plate for releasably holding the relative position of the at least one combustion chamber plate to the chamber during operation of the tool. A release for the latch member is also provided which permits relative movement of the at least one combustion chamber plate and the combustion chamber.

In another embodiment, a combustion chamber assembly for a combustion powered fastener driving tool has a combustion chamber; at least one combustion chamber plate being displaceable in the longitudinal direction of the combustion chamber, a latch member that releasably holds the at least one combustion chamber plate to a first combustion chamber member during displacement of the at least one combustion chamber plate from a second combustion chamber member, and a release for the latch member.

The present invention further provides a latching mechanism for use in a combustion tool including a first combustion chamber plate and a second combustion chamber plate, the combustion chamber plates being movable to a fastener driving tool, having a plurality of combustion chamber plates wherein the combustion chamber plates are movable relative to each other in the chamber, a latch release for the latch member which releasably holds the plurality of combustion chamber plates adjacent to one another; and a latch including a latch member associated with one of the combustion chamber plates in a first position engaged with at least one of the plurality of combustion chamber plates and a second position disengaged with at least one of the plurality of combustion chamber plates.

In another embodiment, a combustion chamber assembly has a combustion chamber plate and a sleeve movable with respect to the combustion chamber plate. The combustion chamber assembly also has a latch member associated with the sleeve for positioning the combustion chamber plate against the sleeve, and the sleeve and the combustion chamber plate are displaceable relative to a tool housing.

In another embodiment, a latching mechanism for a fastener driving tool having at least one combustion chamber plate has a sleeve movable with respect to the combustion chamber plate, and a plurality of latches configured for retaining at least one combustion chamber plate in a first position and a second position.

DETAILED DESCRIPTION OF PREFERRED EMBODIMENT

Figure 1:
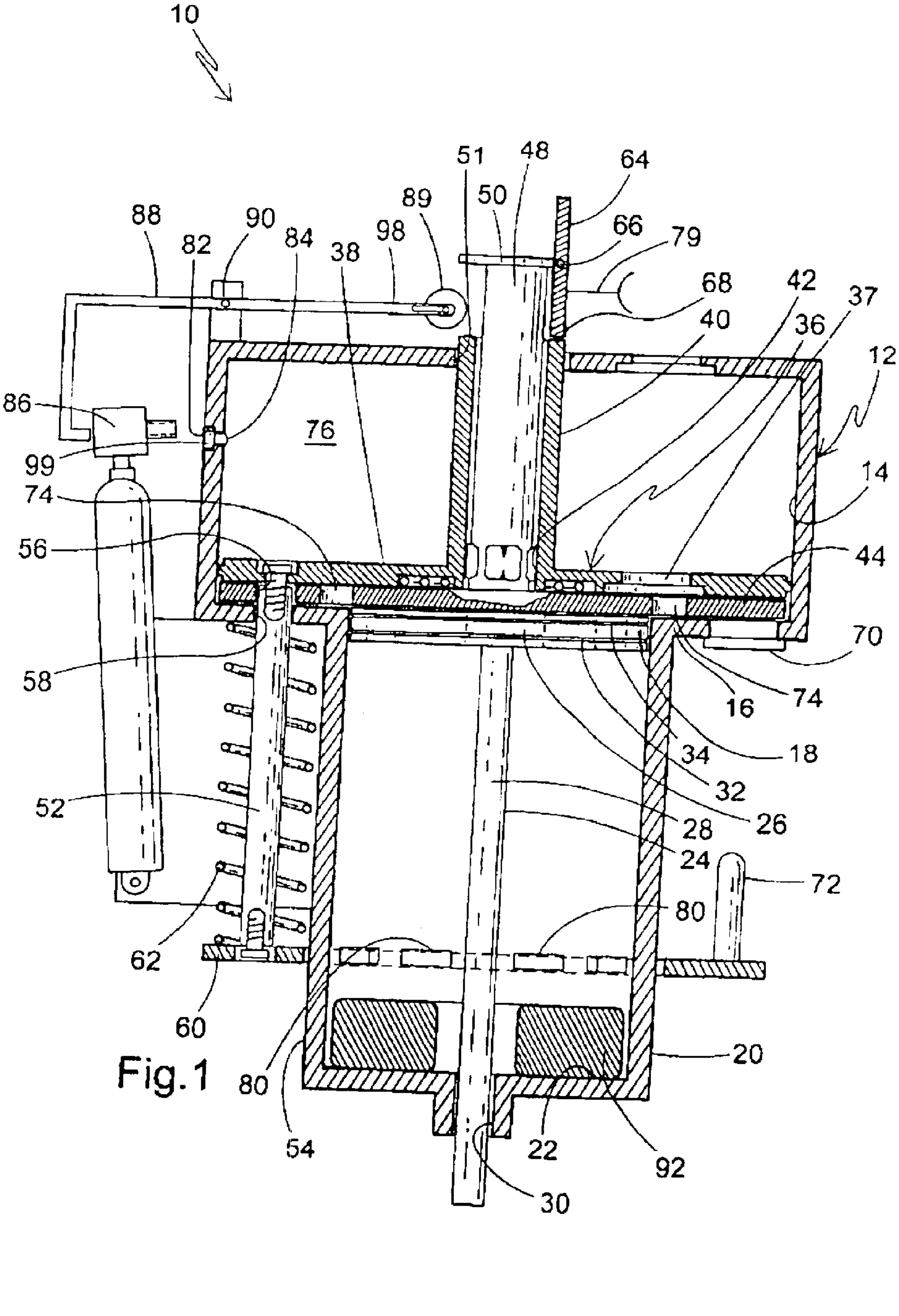
FIG. 1 is a vertical cross-section of the present combustion chamber assembly showing the tool off the work surface.

Referring now to FIG. 1, a combustion chamber assembly suitable in use with combustion tools of the type discussed above, and incorporating one embodiment of the present invention is generally designated 10 and includes a combustion chamber 12 having a generally cylindrical shape with a cylindrical wall 14. A ring-shaped bottom 16 defines an opening 18 at which location a guide cylinder 20 is secured, preferably by integral forming or casting, however other known fastening technologies are contemplated. The guide cylinder 20 has a bottom 22. A piston 24 is located within the piston cylinder 20 and has a piston plate 26 abutting the combustion chamber 12 and a piston rod, or as most commonly called, a driver blade 28 that extends from the piston plate forming a general “T” shape in cross-section. The bottom 22 of the guide cylinder 20 has an opening 30 through which the driver blade 28 protrudes.

In FIG. 1, the tool of the combustion chamber assembly 10 is not in contact with the work surface and the piston 24 is in a retracted position. The piston plate 26 is generally flush with the ring-shaped bottom 16. Sealing rings or piston rings 32, 34 are positioned in spaced relation on the piston plate 26 as is known, and with the piston plate sealingly define a lower end of the chamber 12, creating separate volumes on each side of the piston plate 26. The driver blade 28 slightly protrudes from the opening 30 of the guide cylinder 20.

In the combustion chamber 12, one of two combustion chamber plates includes a plate 36 having a generally cylindrical plate base 38 with a tubular, generally cylindrical portion 40 extending vertically from, and transverse to the base. The plate 36 is configured to be reciprocally movable along the longitudinal axis of the combustion chamber 12. A central opening 42 is defined by the plate 36, extends up through the cylindrical portion 40 and is generally perpendicular relative to the plate base 38.

A separation plate 44 is located between the plate 36 and the ring-shaped bottom 16. The separation plate 44 has an outer diameter corresponding to the inner diameter of the cylindrical wall 14. A movable rod 48 projects through the central opening 42 of the plate 36 and is attached to the separation plate 44. The rod 48 is generally cylindrical and has a length that exceeds the length of the cylindrical portion 40. The rod 48 has an outer diameter generally corresponding to the diameter of the central opening 42 for relative slidably movement and extends transversely from the separation plate 44. A shoulder 50 is located at a free end of the rod 48, has a diameter that exceeds the inner diameter of the central opening 42 and is configured for impeding motion of the rod 48 in the longitudinal direction with respect to the plate 36. Both the cylindrical portion 40 and the rod 48 project through an opening 51 in an upper end of the chamber 12.

Drive rods 52 are fixedly connected to the plate 36 and extend outside of a cylindrical wall 54 of the guide cylinder 20 in a direction generally parallel to the axis of the combustion chamber 12. The drive rods 52 each extend through an upper rod opening 56 formed in the separation plate 44 and a lower rod opening 58 formed in the ring-shaped bottom 16 of the combustion chamber 12. A drive ring 60 is concentrically placed around the cylindrical wall 54 of the guide cylinder 20 and is secured to a lower end of each of the drive rods 52, as seen in FIG. 1. A compression spring 62 is associated with each of the drive rods 52 and extends between the drive ring 60 and the ring-shaped bottom 16 of the combustion chamber 12. When the tool incorporating the combustion chamber assembly 10 is off the work surface, the compression springs 62 bias the plate 36, and in turn, the separation plate 44 toward the ring-shaped bottom 16.

A latching mechanism including a latch member 64 is fixedly and pivotably attached to the shoulder 50 of the cylindrical rod 48 at a pivot point 66, which is disposed generally transversely to the longitudinal axis of the combustion chamber 12. In the present embodiment, the latch member 64, the pivot point 66, the rod 48, the shoulder 50, and the cylindrical portion 40 are considered to be parts of the latching mechanism. In the preferred embodiment, the latch member 64 is attached to the cylindrical rod 48. However, it is also contemplated that the latch member 64 could be pivotably attached to the cylindrical portion 40, as long as the plates 36 and 40 can move in uniform in a first direction, and can be separated for movement in a second direction. Other latching mechanisms contemplated include but are not limited to, a latch member 64 as shown, or any other latch member, a pivot point 66 as shown, or any other pivotable action where a latch member is engaged with a combustion chamber plate 36 and 40. When the latch member 64 is in a vertical orientation (FIG. 1), the plate 36 is engaged at a location 68. When engaged, the contact between the latch 64 and the cylindrical portion 40 prevents the cylindrical rod 48 from moving relative to the cylinder portion 40 and the plate 36. The latch 64 locks the cylindrical rod 48, and in turn, the separation plate 44 in an adjacent and static position relative to the plate 36.

For providing flow out from the combustion chamber 12, a check valve 70 is provided on the ring-shaped bottom 16. In operation, an actuation member 72 is provided on the drive ring 60 opposite the check valve 70. When the drive rods 52 move to increase the distance between the plate 36 and the ring-shaped bottom 16, the actuation member 72 moves in the direction of the check valve 70. When the distance between the plate 36 and the ring-shaped bottom 16 is at its maximum distance, the actuation member 72 and the check valve 70 engage, blocking the check valve and preventing gas flow out from the combustion chamber 12 (as shown in FIG. 2).

A plurality of holes 74 are provided on the separation plate 44. The holes 74 are generally uniformly arranged on the separation plate 44 to allow the flow of gases between a forechamber section 76 and a main chamber section 78, shown in FIG. 3.

A plurality of outlet openings 80 for air and exhaust gas flow out of the guide cylinder 20 is provided at a location closer to the bottom of the cylinder 22. The piston 24 actuates the flow of air and gases out of the outlet openings 80 as the piston passes the outlet openings moving in a direction towards the bottom 22.

Figure 2:
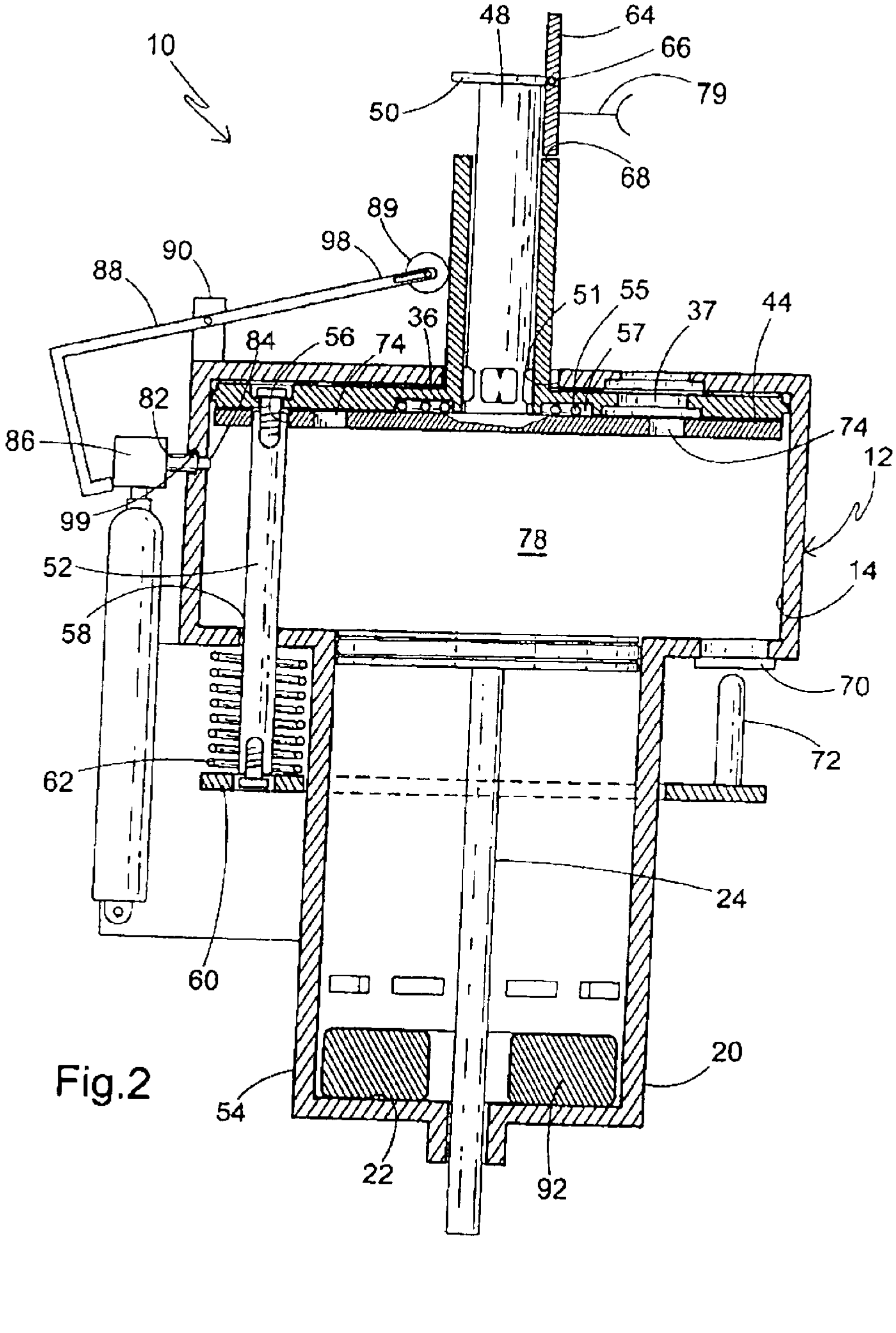
FIG. 2 is a vertical cross-section of the combustion chamber assembly of FIG. 1 showing the tool in contact with the work piece before the latch is released.

Referring to now to FIG. 2, the position of the plate 36 and the separation plate 44 at the top of the combustion chamber 12 correspond to a completely expanded main chamber section 78. When the tool 10 contacts the work piece, the workpiece contact element (not shown) compresses the spring 62 moving the drive ring 60 towards the bottom 16 of the chamber 12, which displaces the plate 36 by the drive rods 52 toward the top of the combustion chamber 12. Since the latch member 64 defaults to a vertical position, the plate 36 lifts the separation plate 44 through engagement between the latch and the cylindrical portion 40. In a vertical orientation, the latch member 64 prevents the cylindrical rod 48, and in turn, the separation plate 44 to which the cylindrical rod is attached, from moving apart from the plate 36 until a trigger 79 (shown schematically) is pulled. A spring 55 is connected to the separation plate 44 and the plate 36 and is located in a recess 57 of the plate 36. The actuation member 72 mounted on the drive ring 60 blocks further movement of the drive ring by contacting the closed check valve 70.

Located on the cylindrical wall 14 of the combustion chamber 12 is at least one radial opening 82. Relatively smaller diameter feed channels 84 communicate with a metering head 86 which delivers fuel to the radial openings 82. As the cylindrical portion 40 moves upward relative to the combustion chamber 12, a stirrup 88 that is pivotally supported on the cylindrical wall 14 by a pivot point 90, and is slidably engaged by the cylindrical portion 40 at a roller 89, moves the metering head 86 towards the feed channel 84. When a metering valve 99 is opened by the metering head 86, fuel is injected into the main chamber section 78.

As the plate 36 and the separation plate 44 are moved to the top of the combustion chamber 12, fuel is mixed with air and the fuel-air mixture is displaced into a main chamber section 78 through ports 37 and holes 74.

A dampening device 92 such as a resilient bumper is located at the bottom 22 for damping the movement of the piston 24. The dampening device 92 may be of rubber or any similar known material.

Figure 3:
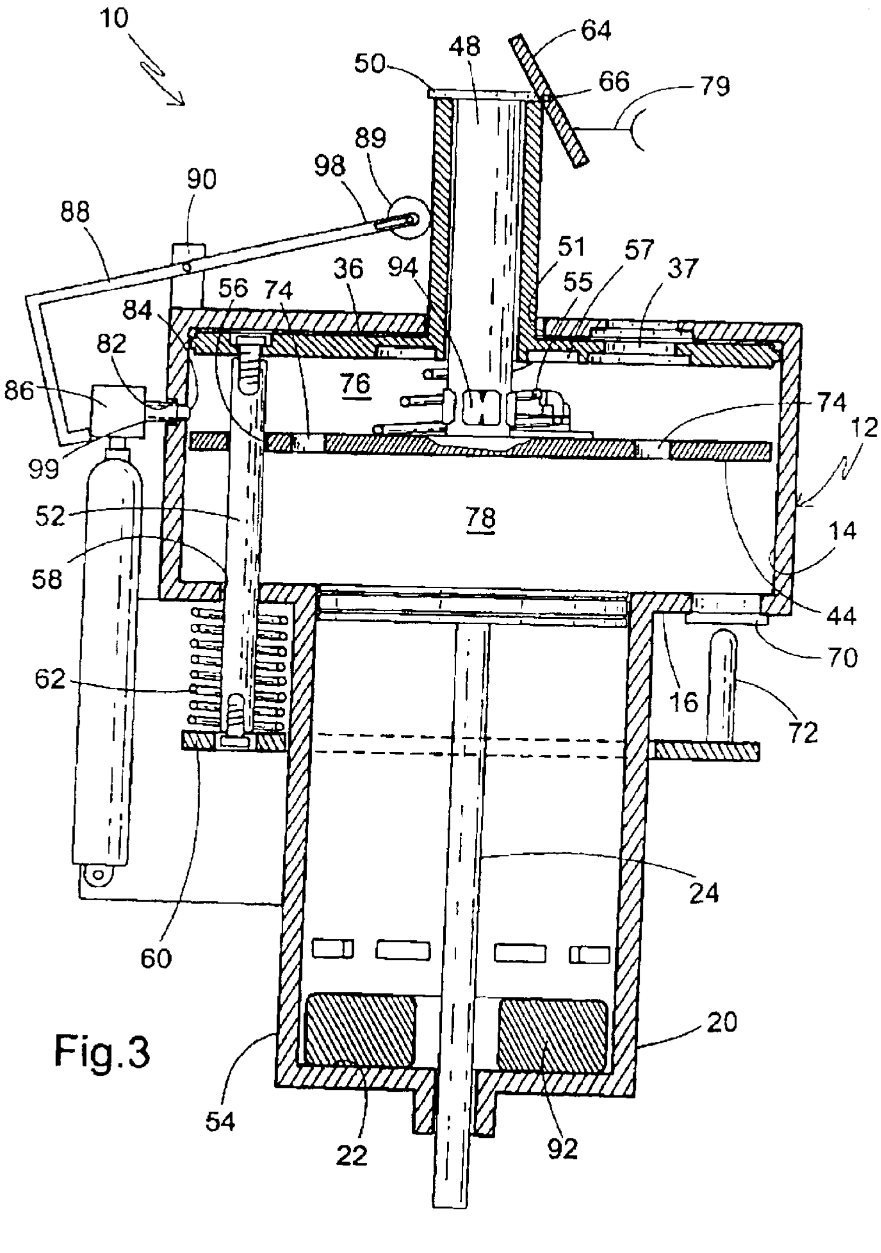
FIG. 3 is a vertical cross-section of the combustion chamber assembly of FIG. 1 showing the latch released.

Referring now to FIG. 3, the tool incorporating the combustion chamber assembly 10 is depicted after the trigger 79 has been pulled. The trigger 79 releases the latch member 64 by moving the latch member to an inclined or non-vertical position, allowing the separation plate 44 to move away from the plate 36, which remains positioned adjacent to the top of the combustion chamber 12. The spring 55, which is disposed in recess 57 when the plates 36 and 44 are together, actuates the movement of separation plate 44. Alternatively, a spring could be located outside of the chamber, such as between the shoulder 50 and the top of plate 36 or any other configuration that would bias the plates 36 and 44 apart. This movement of the separation plate 44 defines a volume between the plate 36 and the separation plate referred to as a forechamber section 76. Fuel is displaced through the holes 74 on the separation plate 44 between the main chamber 78 and the forechamber section 76 as the separation plate moves relative to the plate 36.

An ignition device 94 such as a spark plug is provided for generating an electrical spark for igniting the fuel mixture and is preferably located at the end of the cylindrical rod 48. The ignition device 94 initiates combustion in the forechamber section 76 as the separation plate 44 moves away from the plate 36.

Many variations on the illustrated embodiment are also possible, including different ignition systems, chamber shapes, fuel injectors, and valving and sealing arrangements. Whatever the specific configuration, the operation of the fastener-driving tool incorporating the combustion chamber assembly will be described in detail with reference to FIGS. 1–3.

In operation, the holes 74 of the separation plate 44 enable the displacement of the fuel-air mixture from the main chamber section 78 to the forechamber section 76 so that both chambers have fuel. The flow through the holes 74 in the separation plate 44 causes turbulence in the forechamber section 76. Soon after the trigger 79 is pulled, a spark from the ignition device 94 ignites the turbulent fuel-air mixture in forechamber section 76, resulting in increased flame speed results in the forechamber section. The flame then flows through the holes 74 from the forechamber section 76 to the main chamber section 78. Combustion gases impact the piston 24 and drive the piston down through the guide cylinder 20. The increased flame speeds in the main chamber section 78 result in combustion occurring sooner in the piston stroke such that the piston 24 has more inertia as it is driven down through the guide cylinder 20.

Downward movement of a piston 24 actuates the flow of air and gases out of the one way flow outlet openings 80. After the piston 24 reaches the end of its stroke, it is brought back to its initial position by a vacuum caused by thermal feedback produced by the cooling of the fuel gases. The combustion chamber remains sealed until the piston 24 returns to its initial position.

Figures 4, 5, 6, 7:
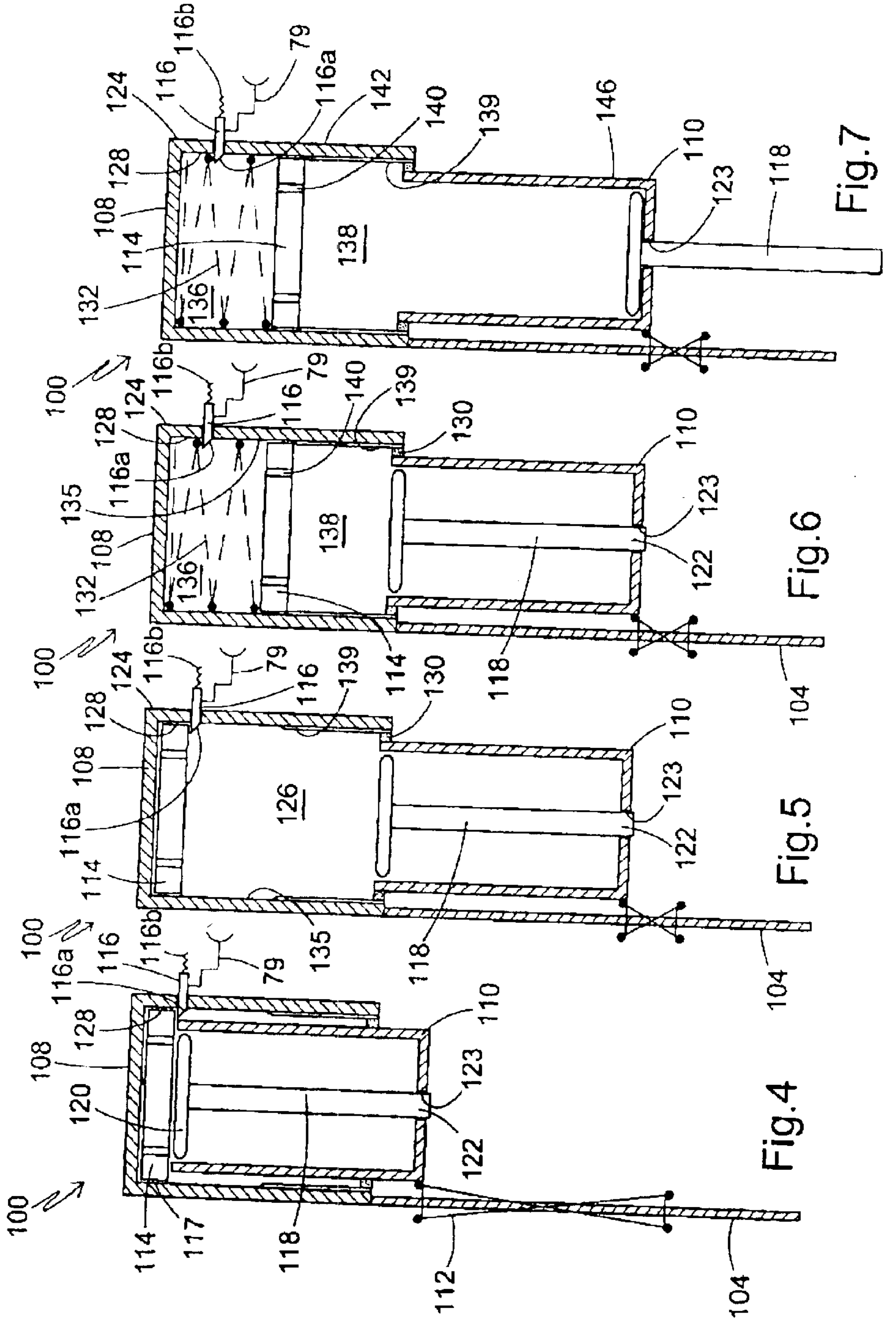
FIG. 4 is a vertical cross-section of an alternate embodiment of the present combustion chamber assembly showing the tool off the work surface.
FIG. 5 is a vertical cross-section of the combustion chamber assembly of FIG. 4 showing the tool in contact with the work surface before the latch is released.
FIG. 6 is a vertical cross-section of the combustion chamber assembly of FIG. 4 showing the latch released.
FIG. 7 is a vertical cross-section of the combustion chamber assembly of FIG. 4 showing the piston extended.

Referring now to FIGS. 4–7, a second embodiment of a combustion chamber assembly having a latching mechanism for a combustion chamber plate of a fastener-driving tool is shown and generally designated 100. A feature of the embodiment 100 is that the latching mechanism uses a simple spring biased latch member and stop configuration. In FIG. 4, the combustion tool of the combustion chamber assembly 100 is similar to the tool of the combustion chamber assembly 10, in which the combustion chamber 10 is mounted, is off the work surface, and a workpiece contact element 104 protrudes from a housing 106 (not shown). A sleeve 108 is collapsed over a piston cylinder 110 and a spring 112 biases the sleeve against the piston cylinder. A divider plate 114 is nested between the piston cylinder 110 and the sleeve 108 preferably near a top of the sleeve (FIG. 4). In addition, the divider plate 114 is dimensioned for slidable movement relative to the sleeve 108. When a laterally reciprocating latch member 116 is engaged, the divider plate 114 is positioned against an inner end surface 117 of the sleeve 108. In the engaged position (FIGS. 4–7), an end 116*a* of the latch member 116 projects into the interior of the sleeve 108. As best seen in FIG. 5, the end 116*a* is preferably inclined, however other configurations are contemplated. Further, the latch member 116 is preferably spring biased to the engaged position by a spring 116*b*.

A piston 118 is located within the piston cylinder 110 for reciprocal movement similar to the piston 24. A piston plate 120 is generally flush with the top of the piston cylinder 110 and a driver blade 122 depends from the piston plate 120 and through an opening 123 in the bottom of the piston cylinder.

Referring now to FIG. 5, the workpiece contact element 104 of the tool is in contact with the work surface and the tool has been depressed against the work piece prior to firing as is known in the art. As the tool is depressed, the workpiece contact element 104 pushes the sleeve 108 into a top position displaced from the piston cylinder 110, thus creating a sleeve volume 126. With the latch member 116 laterally projecting from a wall 128 of the sleeve 108, the latch causes the divider plate 114 to move upward with the sleeve, adjacent the sleeve end wall. Simultaneously, air is drawn into the sleeve volume 126 past a sleeve seal 130. When the sleeve 108 reaches the sleeve top position (FIG. 5), fuel is injected into, (FIGS. 1–4) and sealed in the sleeve volume 126 by the seal 130.

Referring now to FIG. 6, the embodiment 100 is depicted when the latch member 116 is released, or is moved laterally generally outward, after the trigger 79 is fully depressed, causing ignition. A second spring 132 is attached to the sleeve 108 and drives the divider plate 114 downward until a stop 134 disposed on an inner wall 135 of the sleeve 108 engages the divider plate. A first flow volume 136 and a second flow volume 138 are defined in the sleeve volume 126 by the downward displacement of the divider plate 114. The fuel-air mixture flows through holes 140 in the divider plate 114 from the second flow volume 138 to the first flow volume 136. Turbulence is thus created in the first flow volume 136 which is used to produce a faster flame speed.

Referring now to FIG. 7, combustion occurs in the first flow volume 136 by igniting the fuel air mixture when the divider plate 114 reaches the stop 134. In the preferred embodiment, ignition occurs via a spark plug as is shown in the art. While the combustion starts in the first flow volume 136 under turbulent conditions, the flame propagates through the holes 140 in the divider plate 136, igniting the second flow volume 138. The rapid expansion of combustion gases drives the piston 118 down in the piston cylinder 110 to impact a fastener. Venting of the combustion gases occurs when the piston 118 passes check valves 146 at the end of the stroke. The piston 118 returns to the initial position (FIG. 4) in the piston cylinder 110 by the vacuum caused by the cooling of the combustion gases.

Referring now to FIGS. 8–11, another alternative combustion chamber assembly incorporating a latching mechanism is generally designated 150. Components which are shared with the latching mechanism 100 have been designated with identical reference numbers. A distinctive feature of the embodiment 150 is that the latching mechanism uses at least one spring biased latch member and a cam to engage at least one of the latch members. Another feature of the mechanism is that it increases the flow of air and fuel through openings in the divider plate 114, which maximizes the firing response time of the tool. The latching mechanisms of the combustion chamber assembly 10, 100 use a hole size in the divider plate, 44, 114 that optimizes the drive force of the piston. In some applications, the optimal hole size may be too small to allow the divider plate to snap back into the upward position after the tool has been triggered. This affects the rate at which the tool can be repeatedly fired. In the latching mechanism of the combustion chamber assembly 150, an important distinguishing feature is that the shape of a divider plate 152 is modified to achieve large openings when the plate is in the upward motion, yet is occluded by the latching mechanism to maximize the piston drive.

Figures 8, 9, 10, 11:
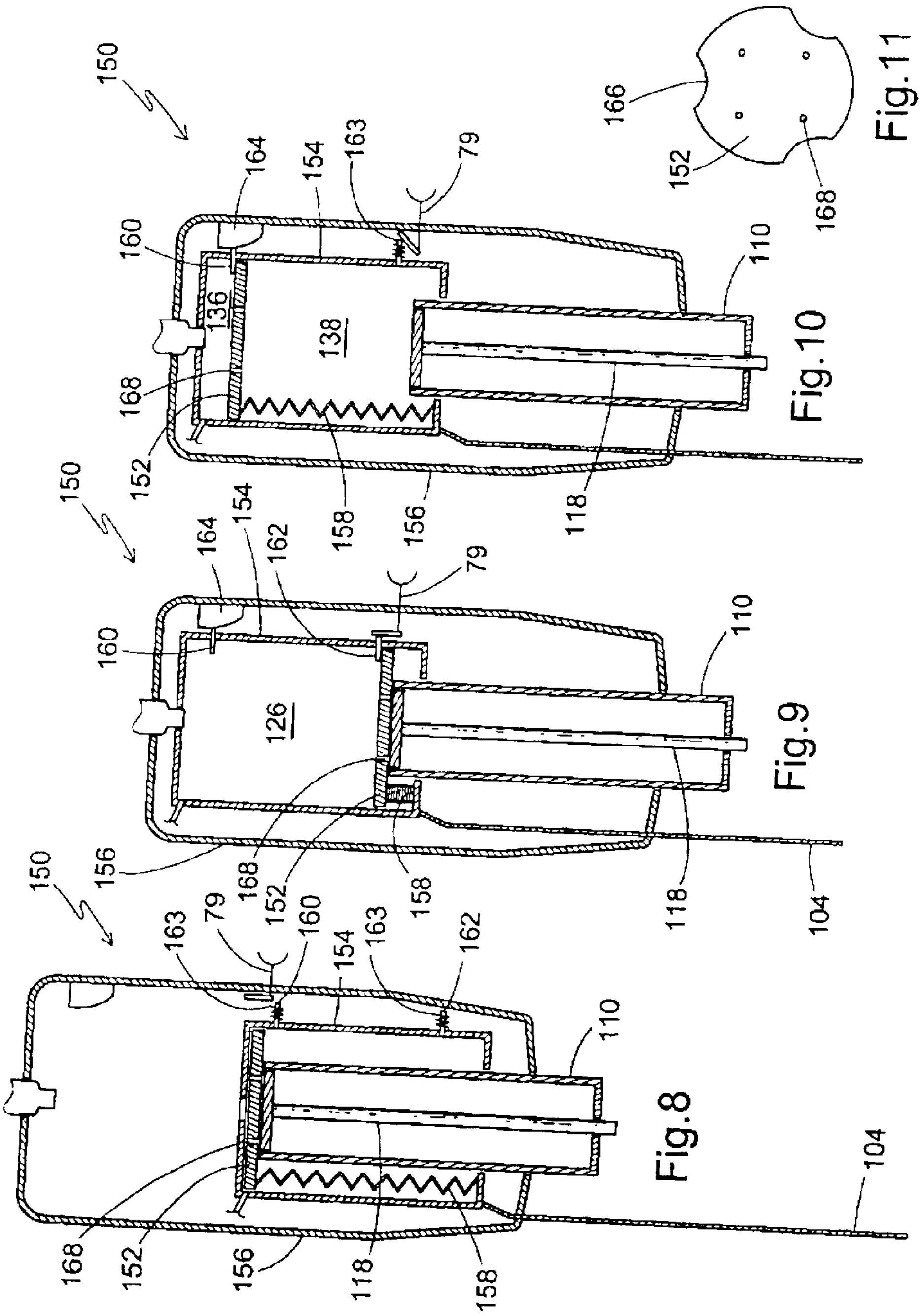
FIG. 8 is a vertical cross-section of another alternate embodiment of the present combustion tool showing the tool off the work surface.
FIG. 9 is a vertical cross-section of the combustion chamber assembly of FIG. 8 showing the tool with a first latch engaged.
FIG. 10 is a vertical cross-section of the combustion chamber assembly of FIG. 8 showing the second latch engaged.
FIG. 11 is a plan view of a divider plate of the tool of FIG. 8.

Referring now to FIG. 8, the latching mechanism of the combustion chamber assembly 150 is shown in the ready position, wherein the workpiece contact element 104 is shown attached to a sleeve 154 in a rest position. The sleeve 154 is collapsed against the divider plate 152 which is, itself, collapsed against the piston 118. A housing 156 is attached to the piston cylinder 110. The sleeve 154 is collapsed over the piston cylinder 110 and a spring 158 biases the divider plate 152 against the piston cylinder. The divider plate 152 is nested between the piston cylinder 110 and the sleeve 154. A first latch member or latch tab 160 and a second vertically displaced latch member or latch tab 162 are biased by springs 163 to project laterally outwardly from the sleeve 154. In addition, the tabs 160, 162 are laterally reciprocable relative to the sleeve 154. The first latch tab 160 is located near a top of the sleeve 154 and the second latch tab 162 is located near the bottom of the sleeve.

Referring now to FIG. 9, the workpiece contact element 104 is placed against the work piece, displacing the sleeve 154 upward and creating the sleeve volume 126. Fuel is injected and mixed with air at the start of sleeve displacement. The second latch tab 162 is slidingly engaged by the trigger 79 and keeps the divider plate 152 against the piston 118. A cam 164 on the housing 156 slidingly engages the first latch tab 160 prior to firing to protrude into the sleeve volume 126. The first latch tab 160 and the second latch tab 162 are formed at different circumferential angles such that scallops 166 (best seen in FIG. 11), are not aligned with the second latch tab 162 but are aligned with the first latch tab 160.

Upon full depression, the trigger 79 releases the second latch tab 162 which slidingly disengages the divider plate 152. Next, the divider plate 152 moves upward against the first latch tab 160 due to a biasing force generated by the spring 158. In this manner, sleeve volumes 156, 138 are defined on either side of divider plate 152. The first latch tab 160 is shaped to occlude the scallops 166 in the divider plate 152. When combustion is initiated in the first flow volume 136, the flame must pass through the divider plate 114 at the holes 168 and are blocked from passing through the divider plate at the scallops 166. The combustion of the gases in the second flow volume 138 causes the piston 118 to be driven down the cylinder 110 for impacting a fastener.

This configuration allows the divider plate 152 to move more easily against the hydraulic friction in the motion upward. This advantage is due to the increased surface area of the total holes 168 in the divider plate 152 when the scallops 166 are not occluded. More air transfer between the first flow volume 136 and the second flow volume 138 can occur as a result of the scallops 166. When there is less hydraulic friction, the divider plate 152 can move upward towards the first latch tab 160 at an increased rate which, in turn, makes the firing cycle shorter.

Accordingly, the latching mechanism of the embodiments discussed above provides a latch member which serves to position at least one movable plate within a combustion chamber of a combustion powered tool. A latching mechanism using spring biasing on at least one latch member was also provided. A feature of the embodiments discussed above is that a simplified mechanism for precisely controlling at least one movable plate for achieving the correct fuel-air mixture in the combustion chamber is provided. The present invention also provides a low cost and easy to repair alternative to electronic or electrical parts.

While particular embodiments of the latching mechanism for a combustion chamber plate of a fastener driving tool has been shown and described, it will be appreciated by those skilled in the art that changes and modifications may be made thereto without departing from the invention in its broader aspects and as set forth in the following claims.

What is claimed is:

1. A combustion chamber assembly for use in a combustion tool including a combustion chamber, at least one combustion chamber plate disposed in said chamber, the at least one combustion chamber plate and the chamber members being configured for relative reciprocal movement, said combustion chamber assembly comprising:

at least one latch member is associated with control of movement of at least one plate within the combustion chamber to divide said chamber into multiple volumes; and a means for releasing said latch member for permitting relative movement of the at least one combustion chamber plate and the combustion chamber.

2. The combustion chamber assembly of claim 1 wherein the tool includes a first combustion chamber plate and a second combustion chamber plate in the combustion chamber and said latch member is configured for releasably securing the first combustion chamber plate relative to the second combustion chamber plate.

3. The combustion chamber assembly of claim 1 further including a cylindrical rod associated with one of said plates and having a shoulder wherein the latch member is on one of said shoulder and said cylindrical rod.

4. The combustion chamber assembly of claim 1 wherein one of said plates has a cylindrical portion sliding relative to said cylindrical rod, said latch member is one of said cylindrical rod and said cylindrical portion.

5. The combustion chamber assembly of claim 1 wherein the latch member is configured to be biased towards the combustion chamber to project laterally until a trigger is pulled.

6. The combustion chamber assembly of claim 1 wherein said latch member pivotably engages the at least one combustion chamber plate.

7. The combustion chamber assembly of claim 1 wherein said latch member is relatively elongate and is pivotably secured to one of the combustion chamber plates for movement between a first position in relatively axial alignment with the combustion chamber and a second position out of general axial alignment.

8. The combustion chamber assembly of claim 7 wherein said release means includes a trigger connected to said latch member for causing movement from said first position to said second position.

9. The combustion chamber assembly of claim 1 further including a combustion chamber sleeve displaceable from at least one of the combustion chamber members and wherein said at least one latch member is disposed on the combustion chamber sleeve.

10. The combustion chamber assembly of claim 9 wherein the latch member is configured to be biased towards the combustion chamber to project laterally until a trigger is pulled.

11. In a combustion powered fastener driving tool, a combustion chamber assembly, comprising:

a combustion chamber;

at least one combustion chamber plate being displaceable in the longitudinal direction of said combustion chamber;

a latch member that releasably holds the at least one combustion chamber plate for common movement with a first combustion chamber member during displacement of the at least one combustion chamber plate from a second combustion chamber member; and means for releasing said latch member.

12. The combustion chamber assembly of claim 11 further including a shoulder and a cylindrical rod wherein said latch member is on one of the shoulder and the cylindrical rod.

13. The combustion chamber assembly of claim 11 further including a first position and a second position of latch member motion, wherein said release means includes a trigger connected to said latch member for causing movement from said first position to said second position.

14. A latching mechanism for use in a combustion tool including a first combustion chamber plate and a second combustion chamber plate, said combustion chamber plates being movable to a fastener driving tool, comprising:

a plurality of combustion chamber plates movable relative to each other in the combustion chamber; and a latch means including at least one a latch member having a first position engaged with at least one of the plurality of combustion chamber plates and a second position disengaged from said at least one of the plurality of combustion chamber plates.

15. The latching mechanism of claim 14 wherein said latch member is pivotably disengaged.

* * * * *